United States Patent
Iwasaki

[19]

[11] Patent Number: 5,917,973
[45] Date of Patent: Jun. 29, 1999

[54] WAVEGUIDE TYPE OF OPTICAL ARRESTER

[75] Inventor: Masaaki Iwasaki, Tokyo, Japan

[73] Assignee: NEC Corporation, Tokyo, Japan

[21] Appl. No.: 09/008,739

[22] Filed: Jan. 21, 1998

[51] Int. Cl.[6] ...................................................... G02B 6/26
[52] U.S. Cl. ............................................. 385/45; 385/132
[58] Field of Search ................................. 385/43, 45, 122, 385/130, 132, 133, 14, 11, 27, 28, 47; 257/80, 81, 117, 118; 372/50, 21; 359/326, 328, 332

[56] References Cited

U.S. PATENT DOCUMENTS

| | | | |
|---|---|---|---|
| Re. 35,516 | 5/1997 | Henry et al. | 385/27 |
| 5,093,876 | 3/1992 | Henry et al. | 385/28 |
| 5,144,636 | 9/1992 | Tatsuno et al. | 372/22 |
| 5,360,982 | 11/1994 | Venhuizen | 385/14 |
| 5,377,283 | 12/1994 | Blake et al. | 385/11 |
| 5,494,834 | 2/1996 | Venhuizen | 257/432 |
| 5,534,101 | 7/1996 | Keyworth et al. | 156/244.12 |

FOREIGN PATENT DOCUMENTS

| | | |
|---|---|---|
| 3-261926 | 11/1991 | Japan . |
| 4-338734 | 11/1992 | Japan . |
| 6-160920 | 6/1994 | Japan . |

OTHER PUBLICATIONS

Japanese Office Action dated Aug. 25, 1998 with English language translation of Japanese Examiner's comments.

*Primary Examiner*—Akm E. Ullah
*Attorney, Agent, or Firm*—Whitham, Curtis & Whitham

[57] ABSTRACT

A linear waveguide 12 is formed on a substrate 11. A non-linear waveguide 13 whose refractive index may vary depending on an electric field intensity of a light is formed in contact with or at a given distance from the linear waveguide 12. These waveguides form a branch structure. The linear waveguide 12 is the original optical transmission path, while the non-linear waveguide 13 is a bypass for an inicident light with an electric field intensity higher than a set value. Adjusting the refractive indices of the linear waveguide 12 and the non-linear waveguide 13 by, for example, selection of materials, can make the incident light 14 transmitted through the linear waveguide 12 when its intensity is below the set value or through the non-linear waveguide 13 when its intensity is equal to or higher than the set value.

12 Claims, 9 Drawing Sheets

WAVEGUIDE TYPE OF OPTICAL ARRESTER

BACKGROUND OF THE INVENTION

1. Field of the Invention

This invention relates to an optical arrester capable of bypassing an incident light with an electric field intensity higher than an allowable limit, e.g., in optical communication, to protect a subsequent optical device, apparatus or system; particularly a waveguide type of optical arrester automatically controlling an optical output via a waveguide formed on an upper surface of a substrate.

2. Description of the Related Art

Optical communication using light as a means for communication has been being developed for a practical use; advanced multi-functional optical communication systems with large capacity have been being developed. In particular, a wavelength-division multiplex communication (hereinafter, referred to as a WDM communication) has been paid more attention, which transmits information via multiple wavelengths utilizing properties of light. Coming of an optical amplifier into practical use has realized a loss-less transmission path, resulting in rapid increase in a transmission distance. In a long-distance optical communication system in which optical amplifiers are connected in a form of multistage, wavelength-dependency of a gain of an optical amplifier may, however, cause a level difference between channels with different wavelengths. Thus, accumulation of gain in an optical amplifier connected in a form of multistage may resultantly lead to excessive amplification of an electric field intensity of the light, which is larger than a maximum allowable limit of subsequent systems and optical devices. To date there are, however, no effective protectors for protecting a system or an optical device as a part of a system against an electric field intensity (power) of a transmitted incident light in an optical transmission such as an optical communication and an optical interface.

Conventional measures usually conduct a feed-back control; for example, attenuating an optical intensity or switching an optical path with an optical switch when necessary, monitoring an output light from an optical amplifier. For example, an output level of an LD light or a gain level of an optical amplifier may be subject to feed-back control with monitoring an output light from the amplifier. Another example is controlling a transmitted output level of a variable optical attenuator subsequent to an optical amplifier in accordance with monitoring data obtained with keeping a gain of the optical amplifier constant. Both of these are system configurations suggested for fixing, i.e. making equivalent, an electric field intensity of a signal light (an incident light) conducted in a transmission path whose wavelength is multiplexed, between channels. Such configurations may be also utilized as a protector (a security system).

Figure 6:
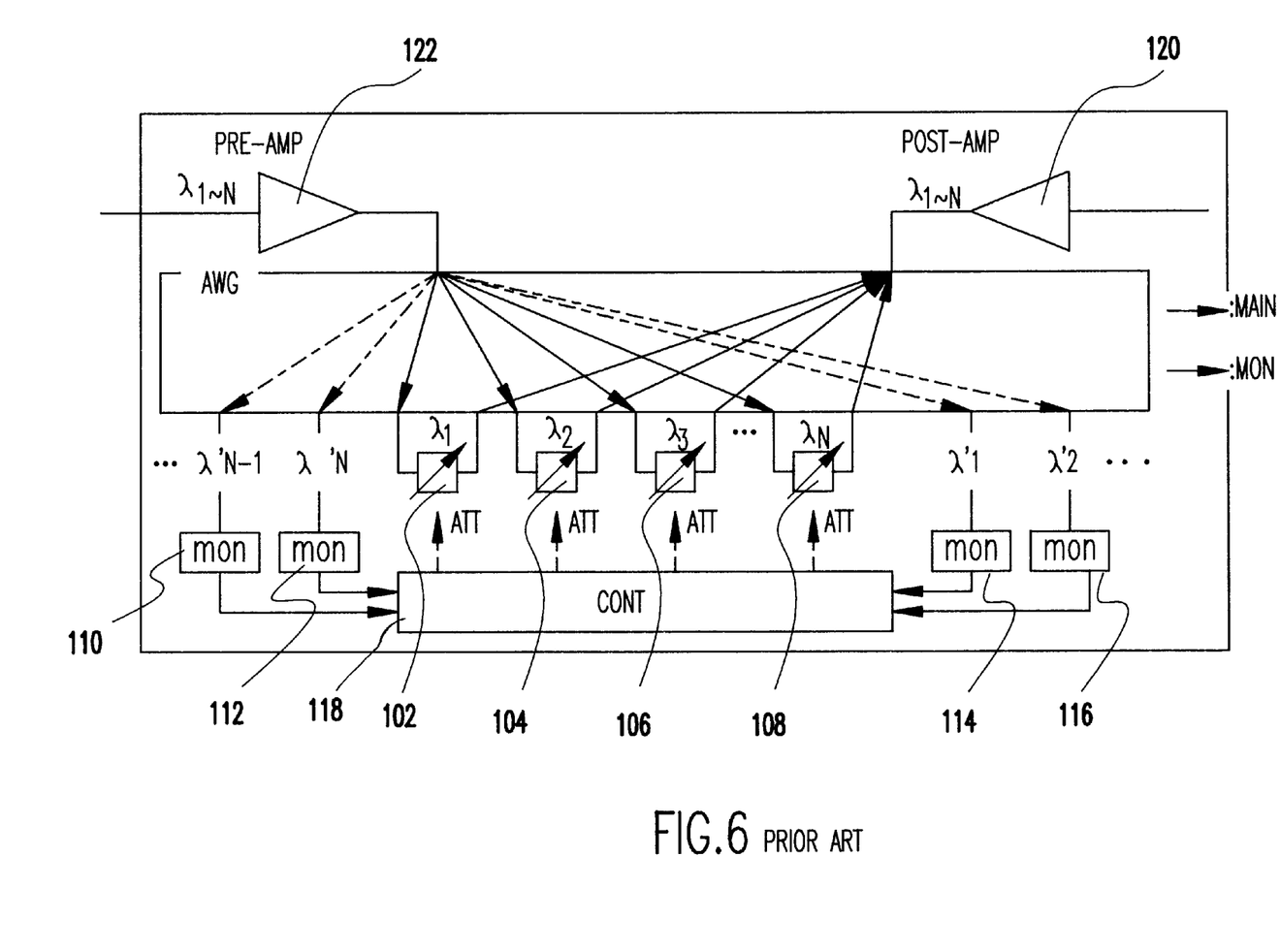
FIG. 6 shows a configuration of a conventional gain equalizing circuit employing optical attenuators.

For example, in the General Meeting of Electronic Information Communication Association, 1996, a presentation titled "Investigation of an EDFA Gain Equalizing Circuit utilizing an Array Lattice Type of Filter (B-1183)", a method as shown in FIG. 6 has been presented, in which a variable optical attenuator for each wavelength channel is placed between a preamplifier 122 and a postamplifier 120 in an optical repeater. The gain equalizing circuit shown in FIG. 6 controls optical attenuators 102, 104, 106 and 108 via a counter 118 in accordance with an intensity of each wavelength detected by monitors 110, 112, 114 and 116.

There have been suggested a wide variety of optical device structures such as the above variable optical attenuator, including from those utilizing an optical technique such as lenses and mirrors to an optical waveguide device utilizing an integrated optical technique. The optical waveguide device is of single mode waveguiding. Therefore, it has an advantage that it can easily control with electro-optic or acoustooptic effects, making it applicable to a variety of applications such as optical communication and optical interconnection.

Figure 7:
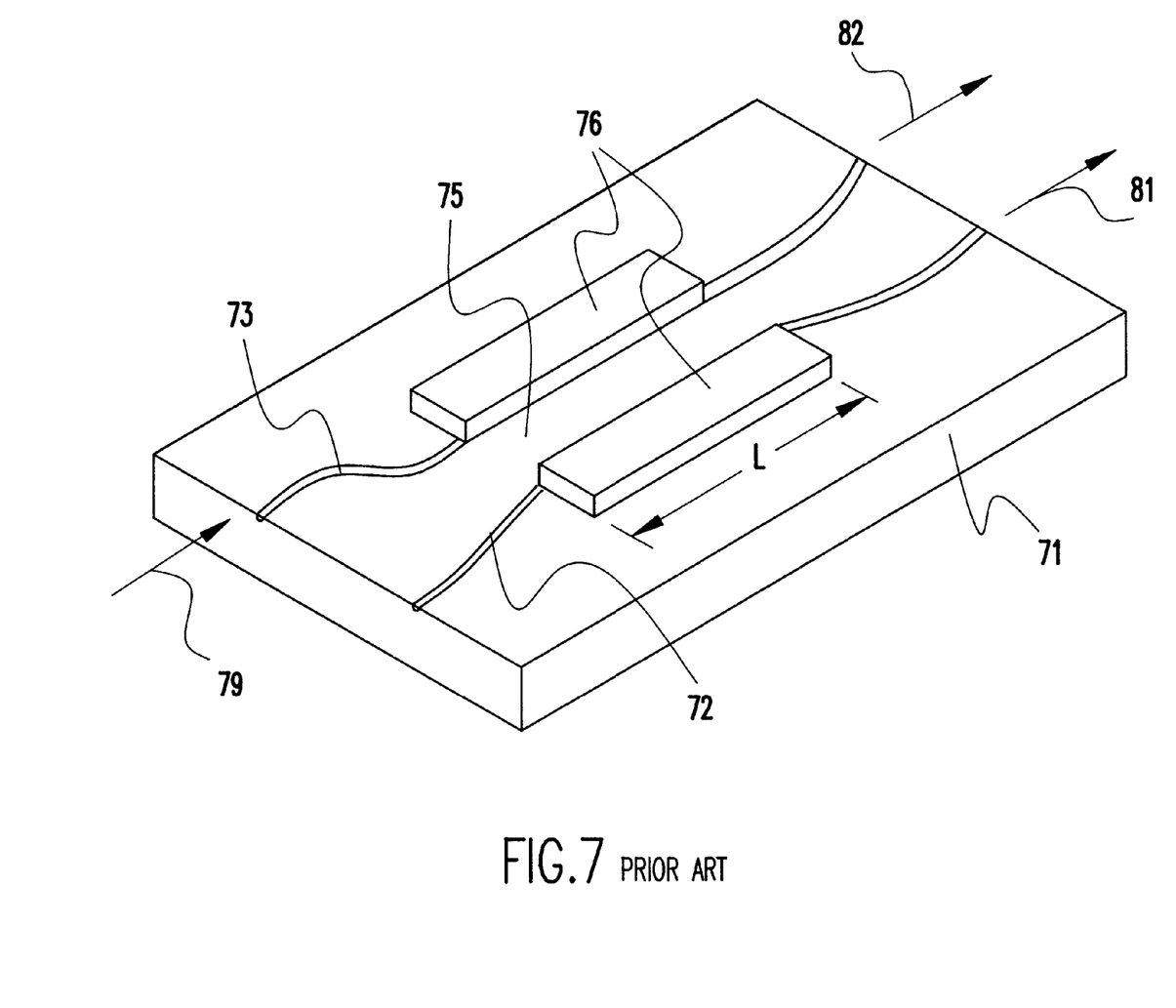
FIG. 7 is a perspective view illustrating a configuration of a conventional waveguide type of optical device.

FIG. 7 is a perspective view of an example of an optical waveguide type of optical device, a directional coupler type of optical switch suitable to, for example, switching an optical path. Optical waveguides 72 and 73 are formed by thermal diffusion of metal such as Ti on an $LiNbO_3$ crystal substrate which is cut vertically to an optical axis and shaped. These optical waveguides 72 and 73 are closely placed in a distance of several micrometers, forming an optical directional coupler 75. On the optical waveguides 72 and 73, a control electrode 76 is formed via a buffer layer (not shown). Here, the optical waveguide always has a constant refractive index to a transmitted radiation. A fundamental principle of operation will be described. First, an incident light 79 enters from an end face of one optical waveguide, e.g., the optical waveguide 73. The light is transmitted through the optical waveguide 73, during which there occurs energy transfer to an adjacent optical waveguide 72 in the area of the optical directional coupler 75. When the length L of the coupling area of the optical directional coupler 75 is equal to a complete connecting length Lc, almost 100% of the energy is transferred to the optical waveguide 72, giving an outgoing light 81. When voltage is applied to the control electrode 76, the refractive indices of the optical waveguides 72 and 73 are changed and become asymmetric each other due to an electro-optic effect, which causes phase mismatching between the incident lights transmitted through both waveguides, leading to change in the coupling state, and thus by applying an appropriate voltage energy is transferred to the original optical waveguide 73 to generate an outgoing light 82. Thus, applying voltage may cause switching of an optical path. Such an optical waveguide device is generally connected with two optical fibers at either of an inlet and an outlet to be used as an optical switch for switching 2×2 optical paths. When optical fibers are connected with the optical waveguide 73 as an inlet and the optical waveguide 72 as an outlet, the device may be used as a variable attenuator.

We have described the prior art of the technique for protecting an optical device or system from a light wave with an intensity higher than a maximum allowable limit. In contrast, this invention, as described later, employs an optical waveguide comprising non-linear medium whose refractive index is variable depending on an electric field intensity of an incidence, which can automatically and effectively bypass a signal light with electric field intensity higher than an allowable limit, from a transmission path without any external control.

The above technique of the prior art, however, has problems as follows. First, a monitor is required. Specifically, a light source or an optical amplifier should be feedback controlled, for detecting the electric field intensity of the transmitted signal light based on information from the monitor to switch the light to a bypass or attenuate its electric field intensity, leading to a more complex apparatus (system) and increase of the number of components. Secondly, when highly precise control is required, circuits for detection and control are necessary in accordance with the number of the channels, making the control system more complex and unsuitable for commercial use. As described above, any of the conventional control procedures has the problem that it makes the system more complex, to cause reduction in reliability, productivity and also maintainability.

An optical device employing a non-linear medium has been disclosed in JP-A 03-174523, which is a technique related to an optical neuro device. The device comprises an input optical waveguide and an output waveguide as well as a parallel plate placed between the waveguides which is made of a non-linear medium. The device has the following functions; once an intensity of an input light becomes higher than a certain level, the refractive index of the parallel plate is changed to be in a resonance state, when a strong coupling is generated between the input and the output optical waveguides to substantially increase the intensity of the output light. In other words, it has a function that it causes a resonance state in the parallel plate made of the non-linear medium to increase the intensity of the output light. In this device, the non-linear medium is used as a member for generating the resonance state, rather than as an optical waveguide. On the other hand, the device of this invention employs a non-linear medium as an optical waveguide and has an advantage that once an intensity of an input light reaches a certain level, the light is automatically guided to a bypass. Thus, the device disclosed in the above application is different from that of this invention in its objects, construction and effects. Furthermore, JP-A 62-502782 has disclosed a technique related to a device comprising an optical waveguide with low loss. In this device, an excessive transmission loss is reduced by selectively placing a non-linear medium at a site where excessive transmission loss (e.g., radiation loss, mode conversion loss) may occur, such as a curve in an optical waveguide with a constant refractive index or a site changing the width of the waveguide. Furthermore, the device is not one in which the waveguide itself is made of a non-linear medium. Therefore, it is different from that of this invention in its objects, construction and effects.

SUMMARY OF THE INVENTION

In the light of the above problems, an object of this invention is to automatically and efficiently bypass a signal light with an electric field intensity higher than an allowable limit from a transmission path, without external control.

To solve the above problems, this invention provide a device, which automatically introduces a signal light with an electric field intensity higher than an allowable limit which has been carried through a transmission path, into a bypass, that is, a device for automatically switching an optical path depending on the electric field intensity of the transmitted light. Since a waveguide type of optical arrester of this invention does not employ a feed-back control system and does not increase the number of components due to a complex controlling circuit, it may advantageously provide a significantly simplified configuration of a circuit or an apparatus, to make the apparatus more compact and lighter and to improve its performance such as a reduced power consumption and a high speed. Furthermore, the device is inserted into a transmission path for use, so that it may be excellent in operability and maintainability.

A waveguide type of optical arrester of this invention comprises a substrate on which is formed an optical waveguide, having at least two branches in respect of a direction of a transmitted light, wherein there is the following relation;

$\alpha < \beta$ wherein $\alpha$ is a branch angle of one waveguide branch A and $\beta$ is a branch angle of another waveguide branch B;

the waveguide branch A is linear and the waveguide consisting the pre-branching waveguide and the waveguide branch B is non-linear, or the waveguide branch A is nonlinear and the waveguide consisting the pre-branching waveguide and the waveguide branch B is linear;

the waveguide branch A is contacted with or separated at a given distance from the waveguide consisting the pre-branching waveguide and the waveguide branch B.

Figure 1:
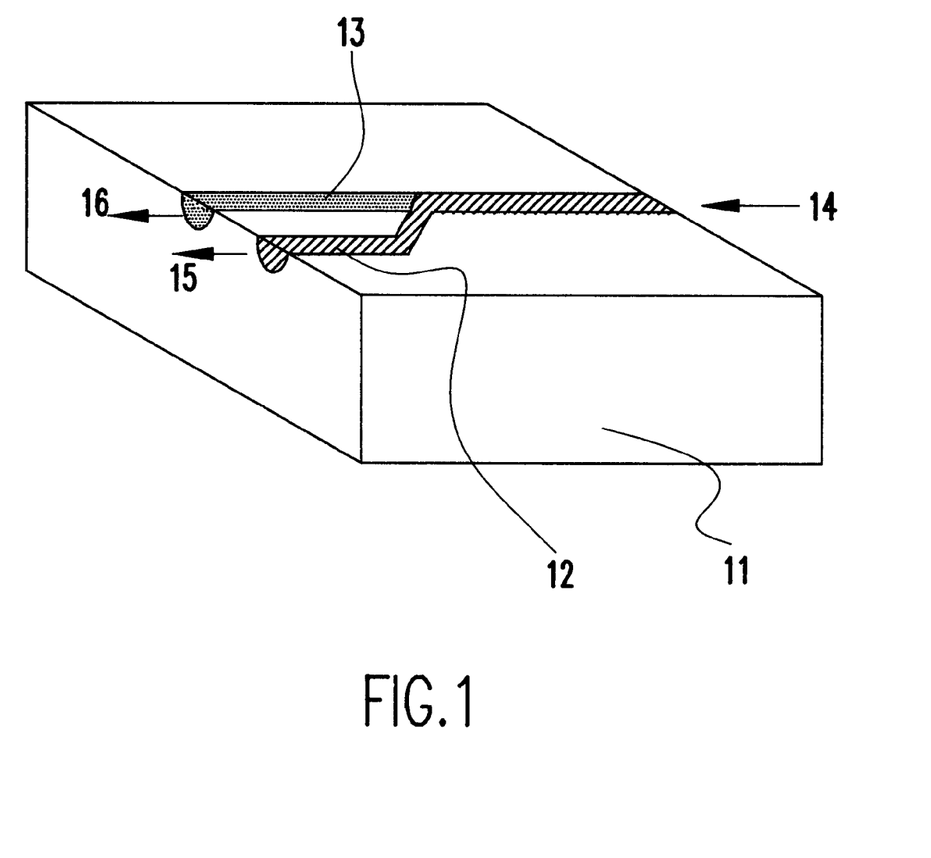
FIG. 1 is a schematic representation of a waveguide type of optical arrester of this invention.

Functions of the waveguide type of optical arrester of this invention will be described with reference to FIG. 1. The waveguide type of optical arrester shown in FIG. 1 can bypass a transmitted light into a non-linear waveguide 13 when an intensity of an incident light becomes higher than a certain level. Specifically, an incident light 14 with an intensity below a certain level is transmitted through an optical waveguide 12 and reflected in the boundary region with a non-linear waveguide 13 at a junction to give an outgoing light 15. On the other hand, once the electric field intensity of the incident light reaches the level, the refractive index of the non-linear waveguide 13 is changed from $n_b$ to $n_a$ depending on the electric field intensity, whereby the incident light 14 transmitted through an optical waveguide 12 goes straight without being reflected at the junction to be transmitted through the non-linear waveguide 13 to give an outgoing light 16. Leak of the incident light 14 as the outgoing light 15 through the optical waveguide 12 is too small to be detected by a subsequent device. Thus, an optical device or system downstream may be protected from a transmitted incident light with an electric field intensity higher than a maximum allowable limit.

DETAILED DESCRIPTION OF THE PREFERRED EMBODIMENTS

A waveguide type of optical arrester of this invention comprises an optical waveguide having a branch structure on a substrate. Materials for the substrate used in this invention is not limited as long as a low loss optical waveguide can be formed on it; preferably glass, silicon, quartz or any dielectric material having an electrooptic effect, which may contain impurities. An electrooptic effect herein refers to an effect that applying an electric field causes change of a refractive index in a ferroelectric crystal such as $LiNbO_3$ and $LiTaO_3$. Since this change instantaneously occurs in theory, a high-speed switch or optical modulator may be provided by applying a voltage to an electrode formed on the optical waveguide. Dielectric materials having an electrooptic effect include a lithium niobate ($LiNbo_3$) crystal and a lithium tantalate ($LiTaO_3$) crystal.

Figure 2A:
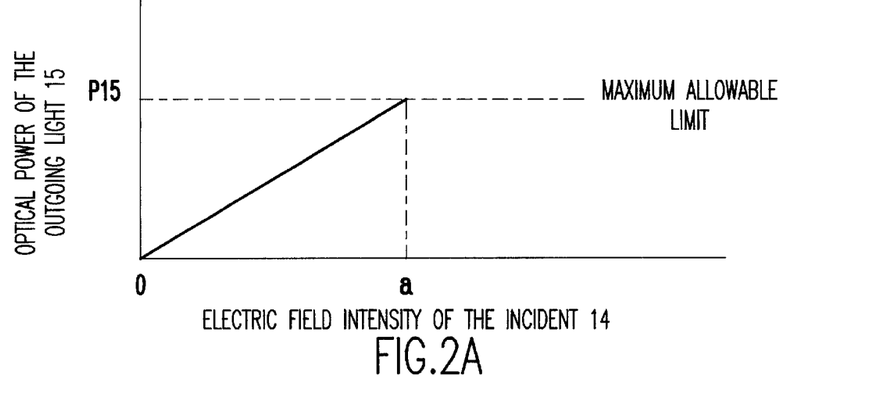
FIG. 2(a) shows a change in an intensity of the outgoing light transmitted through the optical waveguide 12.
Figure 2B:
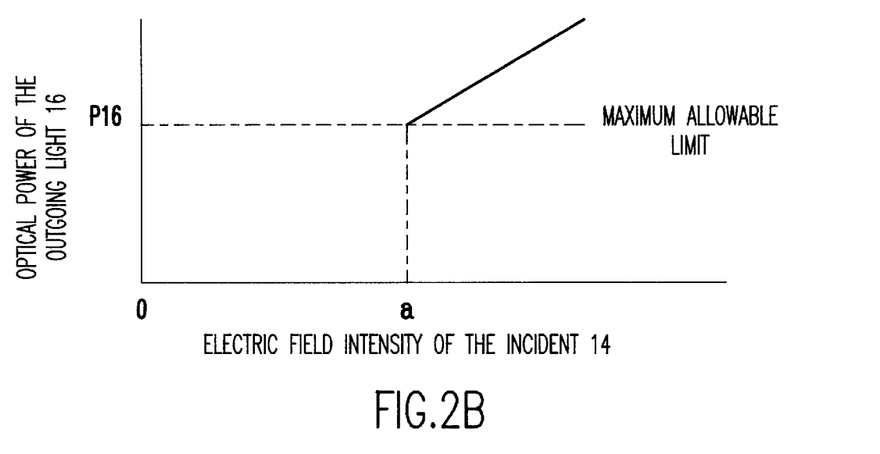
FIG. 2(b) shows a change in an intensity of the outgoing light transmitted through the optical waveguide 13.
Figure 2C:
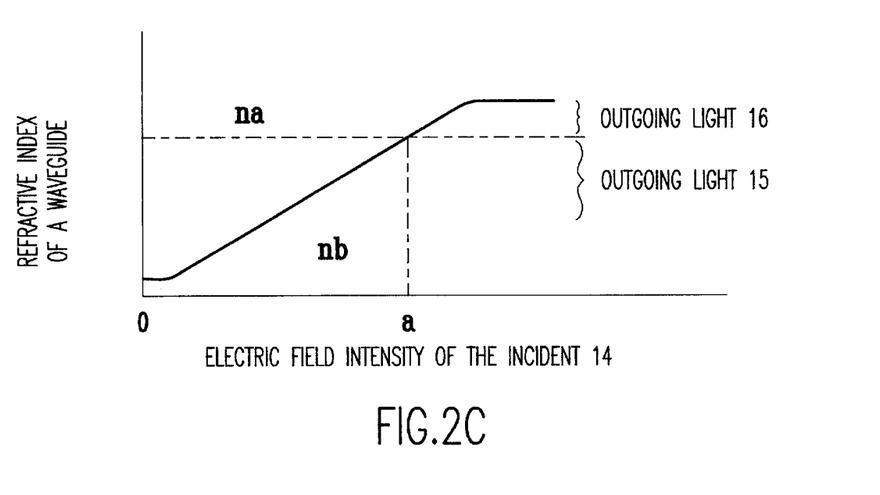
FIG. 2(c) shows a change in a refractive index of the optical waveguide 13.
Figure 9:
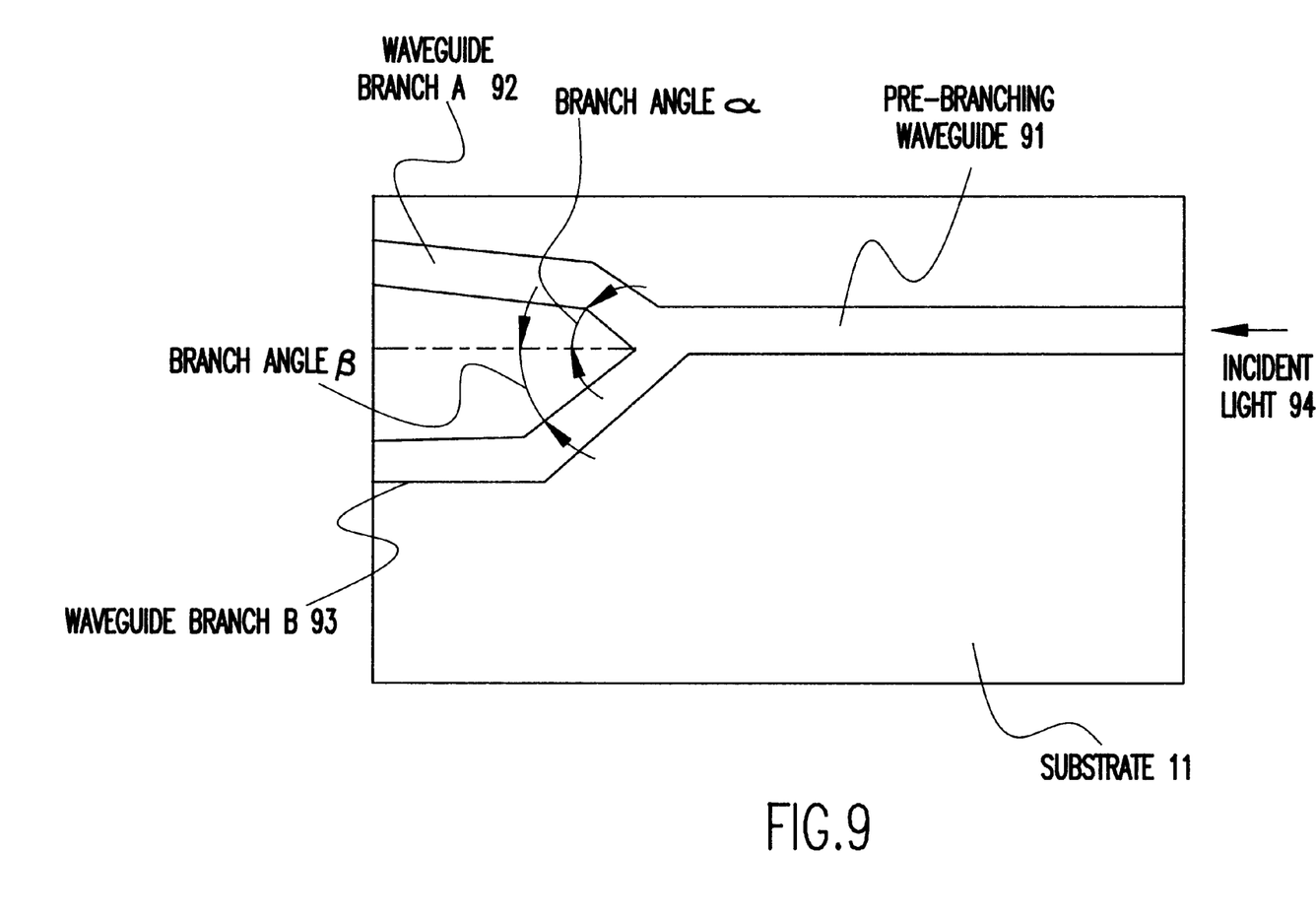
FIG. 9 is a schematic representation of a waveguide type of optical arrester of this invention.

The optical waveguide in this invention may be formed by a suitable process for a substrate material. For example, the followings may be effective as a low-loss optical waveguide. For a glass substrate, the waveguide may be suitably formed by ion exchange. For a substrate consisting of a lithium niobate crystal, it may be preferably formed by proton exchange or thermal diffusion of titanium (Ti). For a substrate essentially consisting of a lithium tantalate crystal, it may be preferably formed by thermal diffusion of niobium (Nb) or patterning of lithium niobate. For a substrate consisting of silicon or quartz, it may be made of silicon oxide. The optical waveguide in this invention has a branch structure with at least two branches as shown in FIG. 9. A pre-branching waveguide 91 and a waveguide branch 93 are made of the same material. When an intensity of an incident light 94 is below a certain level, the light is transmitted through a waveguide consisting of the pre-branching waveguide 91 and the waveguide branch B 93. Here, one of the waveguide A92 and the waveguide consisting of the pre-branching optical waveguide 91 and the waveguide branch B93 is linear, and the other is non-linear. A linear waveguide refers to one whose refractive index is substantially constant independently of an electric field intensity of an incident light. A non-linear waveguide refers to one whose refractive index varies depending on an electric field intensity of an incident light (FIG. 2(c)). When the pre-branching optical waveguide 91 and the waveguide branch B (93) are linear and the waveguide branch A (92) is non-linear, a refractive index of the original transmission path is constant, while that of the bypass for a light with an intensity higher than an allowable limit is variable. On the other hand, when the pre-branching optical waveguide 91 and the waveguide branch B are non-linear and the waveguide branch A is linear, a refractive index of the original transmission path is variable, while that of the bypass for a light with an intensity higher than an allowable limit is constant. In both cases, the object of this invention may be achieved by setting a refractive index of each waveguide as follows; $n_a > n_b$ without an incident light and $n_a = n_b$ when an electric field intensity of an incident light reaches the set value, wherein $n_a$ and $n_b$ are refractive indices of the linear waveguide and the non-linear waveguide, respectively. Thus, the incident light is transmitted through the waveguide branch B when the electric field intensity is higher than the set value, while it is transmitted through the waveguide branch A (92) when the electric field intensity is below the value.

Figure 10:
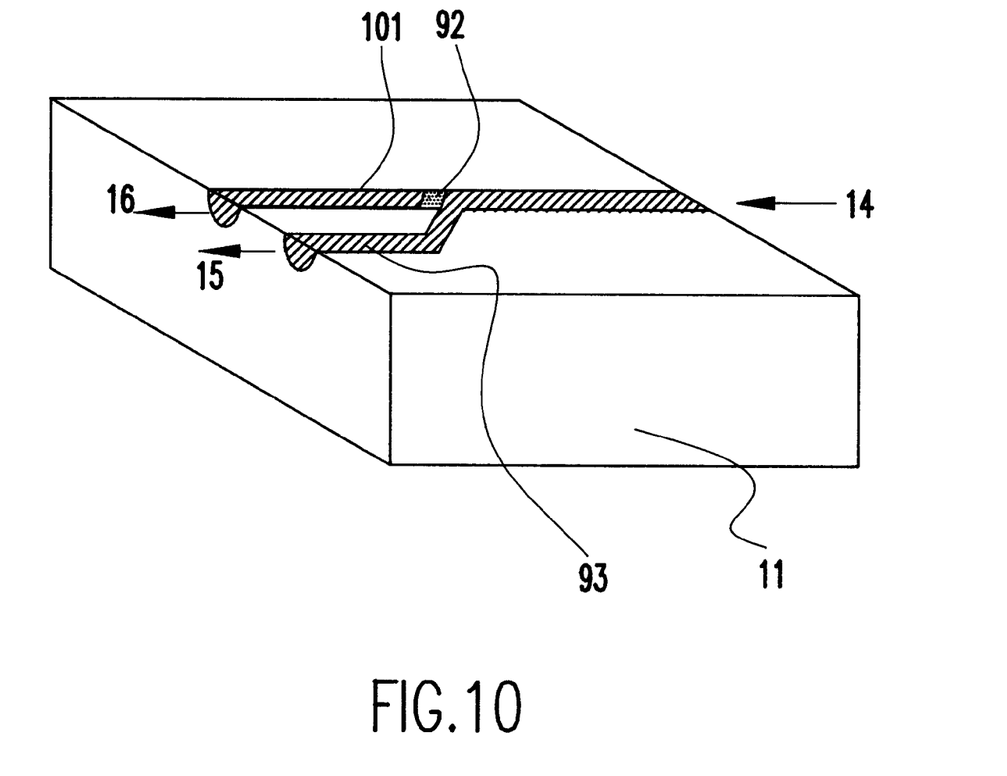
FIG. 10 is another schematic representation of a waveguide type of optical arrester of this invention.

In this invention, it is essentially required that there are at least one linear waveguide and at least one non-linear waveguide at the junction. The structure shown in FIG. 10 may be, therefore, encompassed within this invention. In this figure, the waveguide branch A is non-linear, while the waveguide branch B is linear, and after the waveguide branch A, there is a linear waveguide C. The length of the waveguide branch A may be determined as appropriate, based on, e.g., the set value of the allowable limit.

Figure 8:
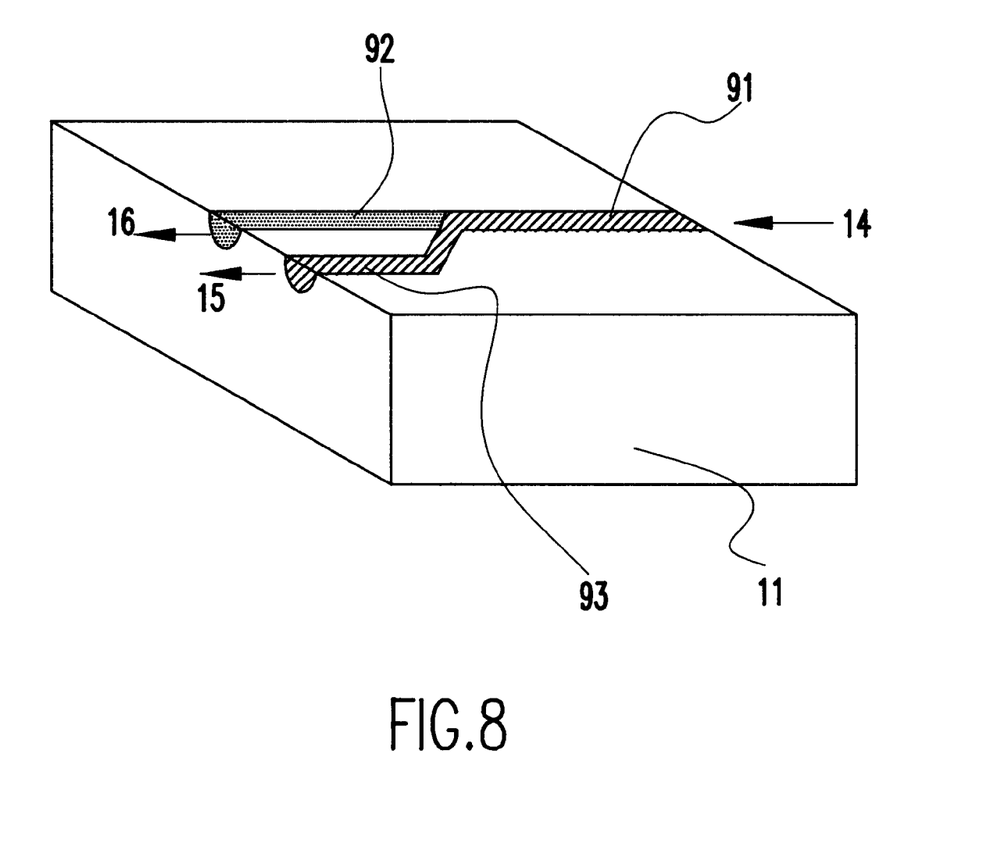
FIG. 8 is an explanatory figure for a branch angle.

In this invention, a branch angle refers to an angle formed between the pre-branching waveguide and the waveguide branch A or B (FIG. 8). The waveguides are formed to meet a condition, $\alpha < \beta$, wherein $\alpha$ and $\beta$ are the branch angles of the waveguide branchs A and B, respectively. In this case, the waveguide branch A is a bypass for an incident light with an intensity higher than an allowable limit. Thus, it is preferable that $\alpha$ is below the certain level and $\beta$ is higher than the level for improving a bypassing efficiency of the incident light. Specifically, a is preferably below 2°, more preferably below 1°, most preferably 0°, while $\beta$ is preferably at least 3°, more preferably at least 7° and preferably less than 90°.

In this invention, the waveguide branch A is contacted with or separated at a given distance from the pre-branching waveguide and the waveguide branch B. A given distance refers to a distance about 5 times wavelength of the light used. It may vary depending on the wavelength of the light used; generally 1 to 9 $\mu$m. A device having such a configuration, i.e., separated waveguides at a given distance, is generally called an optical directional coupler, in which 100% of optical power can be transferred between two waveguides in theory.

A non-linear waveguide in a device of this invention may be made of any medium whose refractive index varies depending on an electric field intensity of a transmitted incident light; for example organic materials and dielectric materials. Specifically, such dielectric materials include ADP ($NH_4 \cdot H_2PO_4$) and KDP ($KH_2PO_4$), and such organic materials include PTS polymer (polydieacetylene).

Operation of a waveguide type of optical arrester of this invention will be described with reference to FIG. 1. The waveguide type of optical arrester shown in FIG. 1 comprises the substrate 11, on the surface of which are formed the linear waveguide 12 and the non-linear waveguide 13 contacted with the waveguide 12, forming a branch structure. The linear waveguide 12 is the original transmission path. The non-linear waveguide 13 is a bypass for an incident light with an electric intensity higher than the set value, through which the light outgoes to another port in a manner that an outgoing light 16 does not couple to the original transmission path (the linear waveguide 12). The refractive index of the non-linear waveguide 13 is $n_b$, whose value is set as $n_a > n_b$ ($n_a$ is the refractive index of the linear waveguide 12 ) is without an incident light. Here, optical fibers to be connected with the transmission path are connected with the linear waveguide 12 for both incidence and outgoing. The incident light 14 into the linear waveguide 12 with an intensity below a (FIG. 2) is transmitted through the linear waveguide 12 and reflected in the boundary region with a non-linear waveguide at a junction to give the outgoing light 15. The electric field intensity of the incident light 14 is too low for the light to be transmitted through the non-linear waveguide 13 to increase the refractive index of the non-linear waveguide $n_b$ to $n_a$, so that the outgoing light 16 is not observed. Next, once the electric field intensity of the incident light becomes higher than a, the refractive index $n_b$ of the non-linear waveguide 13 is increased almost to $n_a$ depending on the electric field intensity of the incident light 14, the incident light 14 transmitted through a waveguide 12 goes straight without being reflected at the junction to be transmitted through the non-linear waveguide 13 to give the outgoing light 16. Leak of the incident light 14 as the outgoing light 15 through the optical waveguide 12 is too small to be subsequently detected. Thus, a transmitted incident light with an electric field intensity higher than a maximum allowable limit can be efficiently bypassed.

EXAMPLE 1

Figure 3:
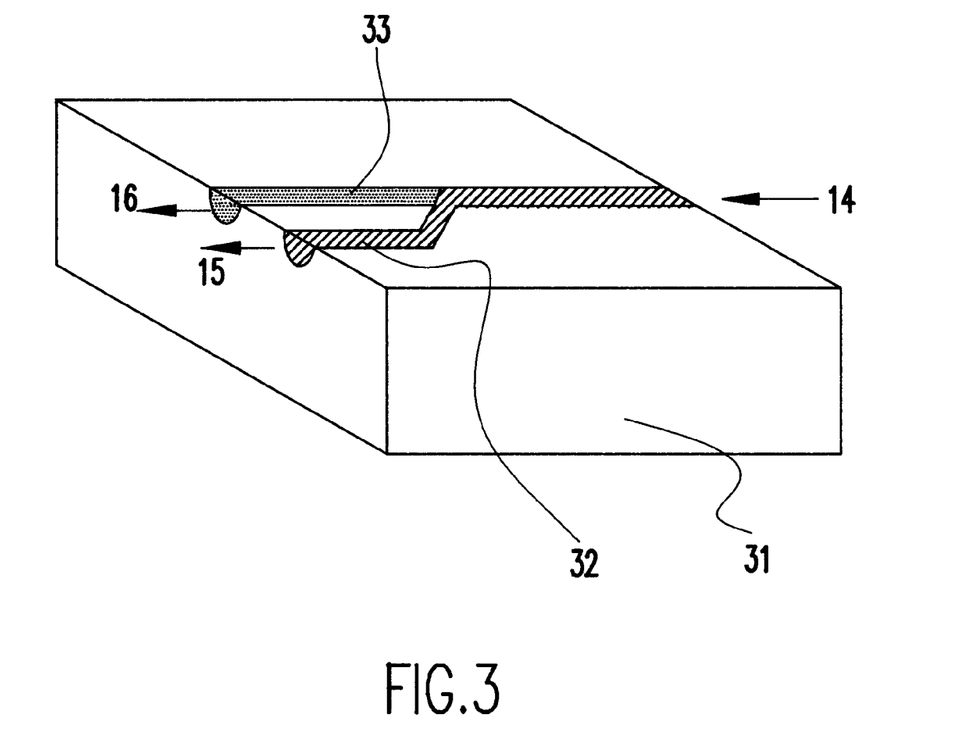
FIG. 3 is a schematic representation of a waveguide type of optical arrester of this invention.

An embodiment of this invention will be detailed with reference to FIG. 3. The waveguide type of optical arrester of this example comprises a soda glass substrate 31 on which is formed an ion-exchange optical waveguide 32 to be inserted in an original transmission path and in which is built a PTS polymer non-linear waveguide 33 contacted with the optical waveguide 32. The ion-exchange optical waveguide 32 may be formed as follows. On the surface of the soda glass 31 is formed a titanium (Ti) layer about 800 nm in thickness by EB vapour deposition, on which is opened a pattern area about 4 μm in width for a linear optical waveguide. Then, the glass substrate is soaked in potassium nitrate (KNO₃) at about 350° C. It is allowed to stand for about 1 hour, during which potassium ions (K⁺) are selectively exchanged by sodium ions (Na⁺) in the opened area of the titanium layer to form a three dimensional waveguide, although the width of the formed optical waveguide is about 6 μm due to diffusion of potassium ions in the transverse direction. Materials which may be used as a mask for forming the waveguide include, besides Ti, materials insoluble in an ion-exchange solution such as aluminum (Al). The PTS polymer non-linear waveguide 23 may be formed by forming a groove for building in a polymer and then filling the groove with the PTS polymer. The groove may be generally formed by forming a mask in a similar manner to formation of an ion-exchange waveguide and then performing dry or wet etching. Excimer laser irradiation in an electrolyte solution may permit a precise machining of the groove for simplifying the manufacturing process.

Next, operation of the waveguide type of optical arrester of this example will be described. The incident light 14 into the ion-exchange waveguide 32 with an electric field intensity below the allowable limit is transmitted through the ion-exchange waveguide 32 to give the outgoing light 15. The electric field intensity of the incident light 14 is too low for the light to be transmitted through the PTS polymer waveguide 33 to increase its refractive index $n_b$ to $n_a$, so that the outgoing light 16 is not observed. However, once the electric field intensity of the incident light 14 becomes higher than the allowable limit (the set value), the refractive index $n_b$ of the PTS polymer waveguide 33 is increased almost to $n_a$ depending on the electric field intensity of the incident light, and then the major part of the incident light 14 is transmitted through the PTS polymer waveguide 33 to give the outgoing light 16. When the branch angle between the ion-exchange waveguide 32 and the PTS polymer waveguide 33 is equal to or larger than 10°, the outgoing light 15 transmitted through the ion-exchange waveguide 32 can be attenuated by up to about 20 dB.

EXAMPLE 2

Figure 4:
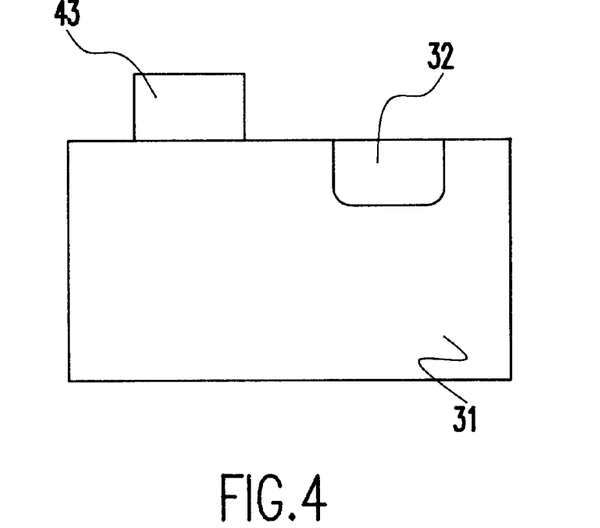
FIG. 4 is a schematic sectional view of a waveguide type of optical arrester of this invention from its outgoing side.

A second embodiment of this invention will be described with reference to FIG. 4. In this example, a PTS polymer waveguide 43 is loaded near an ion-exchange waveguide 32, on the surface of the soda glass substrate 31. A fine and low loss optical waveguide may be formed by applying the lithographic technique using LB film resist described in "IEE PROCEEDINGS, Vol.130, Pt.1, No.5, Oct. 1993", to realize an operability similar to the device in the above example.

Figure 5:
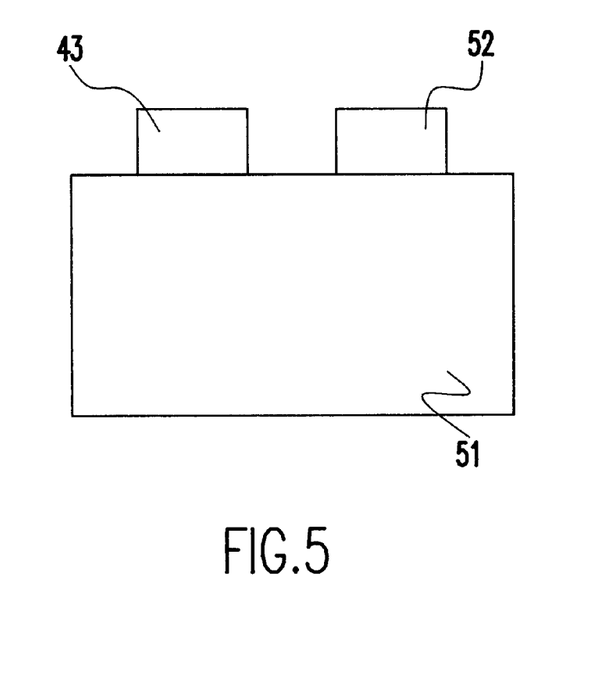
FIG. 5 is a schematic sectional view of another waveguide type of optical arrester of this invention from its outgoing side.

In the above examples, an ion-exchange waveguide is formed on a glass substrate. Furthermore, a ferroelectric crystal substrate consisting of lithium niobate (LiNbO₃) or lithium tantalate (LiTaO₃) may also exhibit good properties. For an LiNbO₃ crystal substrate, a low-loss optical waveguide may be formed by thermal diffusion of titanium (Ti) at about 1000° C. or by ion exchange of lithium ions (Li⁺) with protons (H⁺) in benzoic acid solution at 200 to 250° C. For an LiTaO₃ crystal substrate, an optical waveguide may be formed by thermal diffusion of niobium (Nb) (built-in type) or by patterning a LiNbO₃film (ridge type). A non-linear waveguide may be formed as a built-in or ridge type as described above. Both of the linear and the non-linear waveguides may be also formed a ridge type on a silicon or quartz substrate (FIG. 5).

As described above, since the waveguide type of optical arrester of this invention employs a non-linear waveguide whose refractive index may vary depending on an electric field intensity of a light, it can automatically and effectively bypass a signal light with an electric field intensity higher than an allowable limit, from a transmission path without any external control. Since it is not necessary to monitor a transmitted light, the device does not increase the number of components due to a complex controlling circuit, and thus may advantageously provide a significantly simplified configuration of a circuit or an apparatus.

Furthermore, the waveguide type of optical arrester of this invention may be inserted into a transmission path for use and sequentially process an original signal for each channel, so that a single device may perform a highly precise control and be excellent in operability and maintainability.

What is claimed is:

1. A waveguide type of optical arrester, comprising a substrate on which is formed an optical waveguide, having at least two branches in respect of a direction of a transmitted light, wherein there is the following relation;

$$\alpha < \beta$$

wherein α is a branch angle of one waveguide branch A and β is a branch angle of another waveguide branch B; the waveguide branch A is linear and the waveguide consisting the pre-branching waveguide and the waveguide branch B is non-linear, or the waveguide branch A is non-linear and the waveguide consisting the pre-branching waveguide and the waveguide branch B is linear;

the waveguide branch A is contacted with or separated at a given distance from the waveguide consisting the pre-branching waveguide and the waveguide branch B.

2. A waveguide type of optical arrester as claimed in claim 1, wherein the pre-branching optical waveguide and the waveguide branch B are linear and the waveguide branch A is non-linear; $n_a > n_b$ without an incident light and $n_a = n_b$ when an electric field intensity of an incident light reaches the set value, wherein $n_a$ and $n_b$ are the refractive indices of the linear waveguide and the non-linear waveguide, respectively.

3. A waveguide type of optical arrester as claimed in claim 1, wherein the pre-branching optical waveguide and the waveguide branch B are non-linear and the waveguide branch A is linear; $n_a > n_b$ without an incident light and $n_a = n_b$ when an electric field intensity of an incident light reaches the set value, wherein $n_a$ and $n_b$ are the refractive indices of the linear waveguide and the non-linear waveguide, respectively.

4. A waveguide type of optical arrester as claimed in claim 1, wherein $0° \leq \alpha \leq 2°$ and $3° \leq \beta < 90°$.

5. A waveguide type of optical arrester as claimed in claim 1, wherein $0° \leq \alpha \leq 1°$.

6. A waveguide type of optical arrester as claimed in claim 1, wherein the said non-linear waveguide is made of an organic material.

7. A waveguide type of optical arrester as claimed in claim 1, wherein the said non-linear waveguide is made of a dielectric material.

8. A waveguide type of optical arrester as claimed in claim 1, wherein the said substrate is made of glass and the said linear waveguide is formed by ion-exchange.

9. A waveguide type of optical arrester as claimed in claim 1, wherein the said substrate is made of silicon or quartz and the said linear waveguide is made of silicon oxide.

10. A waveguide type of optical arrester as claimed in claim 1, wherein the said substrate is made of a dielectric crystal exhibiting an electrooptic effect.

11. A waveguide type of optical arrester as claimed in claim 10, wherein the said dielectric crystal is a lithium niobate crystal and the said linear waveguide is formed by proton exchange or thermal diffusion of titanium (Ti).

12. A waveguide type of optical arrester as claimed in claim 10, wherein the said dielectric crystal is a lithium tantalate crystal and the said linear waveguide is formed by thermal diffusion of niobium (Nb) or patterning of lithium niobate.

* * * * *

UNITED STATES PATENT AND TRADEMARK OFFICE
CERTIFICATE OF CORRECTION

PATENT NO. : 5,917,973
DATED : June 29, 1999
INVENTOR(S) : Masaaki Iwasaki

It is certified that error appears in the above-identified patent and that said Letters Patent is hereby corrected as shown below:

Item [30] Foreign Application Priority Data -- February 14, 1997 [JP] Japan 030361/1997

Signed and Sealed this

Eighteenth Day of January, 2000

Attest:

Q. TODD DICKINSON

*Attesting Officer*  *Commissioner of Patents and Trademarks*